(12) United States Patent
Lai

(10) Patent No.: US 7,599,000 B2
(45) Date of Patent: Oct. 6, 2009

(54) SUPPORTING FRAME FOR CCTV CAMERA ENCLOSURE

(76) Inventor: Simon Y. K. Lai, 6F-2, No. 79, Sec. 4, Jen Ai Rd., Taipei (TW)

( * ) Notice: Subject to any disclaimer, the term of this patent is extended or adjusted under 35 U.S.C. 154(b) by 653 days.

(21) Appl. No.: 11/332,333

(22) Filed: Jan. 17, 2006

(65) Prior Publication Data

US 2007/0165137 A1     Jul. 19, 2007

(51) Int. Cl.
*H04N 5/225* (2006.01)
*G05B 17/00* (2006.01)

(52) U.S. Cl. .................................. 348/373; 396/427
(58) Field of Classification Search ................ 348/373, 348/375; 396/427; 248/187.1
See application file for complete search history.

(56) References Cited

U.S. PATENT DOCUMENTS

| 6,292,222 B1 * | 9/2001 | Bernhardt | 348/375 |
| 2005/0270414 A1 * | 12/2005 | Lee | 348/373 |

* cited by examiner

*Primary Examiner*—Jason Chan
*Assistant Examiner*—Leslie Virany
(74) *Attorney, Agent, or Firm*—Leong C. Lei

(57) ABSTRACT

A support frame for CCTV camera enclosure is disclosed. The support frame comprises a support body supporting the structure of the support frame; a rotating section mounted onto the support body and the rotating section horizontally rotated with respect to the axial hole via the support body; a securing section mounted onto the rotating section and the securing section being rotated vertically; and a contact face with protruded teeth corresponding to the rotating section and the securing section to secure the CCTV camera in a best position.

1 Claim, 6 Drawing Sheets

SUPPORTING FRAME FOR CCTV CAMERA ENCLOSURE

BACKGROUND OF THE INVENTION (a) Technical Field of the Invention

The present invention relates to supporting frame, and in particular, to a support frame which supports or holds a CCTV camera enclosure.

(b) Description of the Prior Art

On many roads or lanes in a city or town, or in public plates such as bus stations, taxi stations or train stations, CCTV cameras are now widely installed so as to monitor or to record the status of these places to minimize the crimes carried out in these places. Generally, the CCTV camera is fixed such that the CCTV is allowed to move up and down and the horizontal angle adjustment. Therefore, it is important that the support frame for the CCTV enclosure is important. Taiwan Patent No. 2676939 is related to the base for a CCTV having a body, a securing section and a connection to the securing section. There are two ways of horizontal rotations in order to see all position. The drawback of this CCTV is the exposure of wire outside a shade and therefore, the wires may be damaged after sometime of use.

As shown in FIG. 1, in order to solve the above drawback, the support frame is designed in such a way that the interior is hollow, and the wiring is positioned within the frame to connect with the enclosure. Therefore, the wirings are kept from exposure. However, the contact face 100 is connected by means of bolt 200 and nut 300 which facilitates mounting but the contact surface is small and therefore, the enclosure may be dislocated due to external force, or the angle of enclosure is altered to dislocate.

Accordingly, it is an object of the present invention to provide a supporting frame for CCTV camera enclosure which mitigate the above drawback.

SUMMARY OF THE INVENTION

The primary purpose of the present invention is to provide a support frame for CCTV enclosure comprising a support body supporting the structure of the support frame; a rotating section mounted onto the support body and the rotating section horizontally rotated with respect to the axial hole via the support body; a securing section mounted onto the rotating section and the securing section being rotated vertically; and a contact face with protruded teeth corresponding to the rotating section and the securing section to secure the CCTV camera in a best position.

Yet another object of the present invention is to provide a supporting frame for CCTV camera enclosure, wherein the interior of the support frame is hollow to allow wiring of the CCTV camera to pass through to the CCTV camera enclosure.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
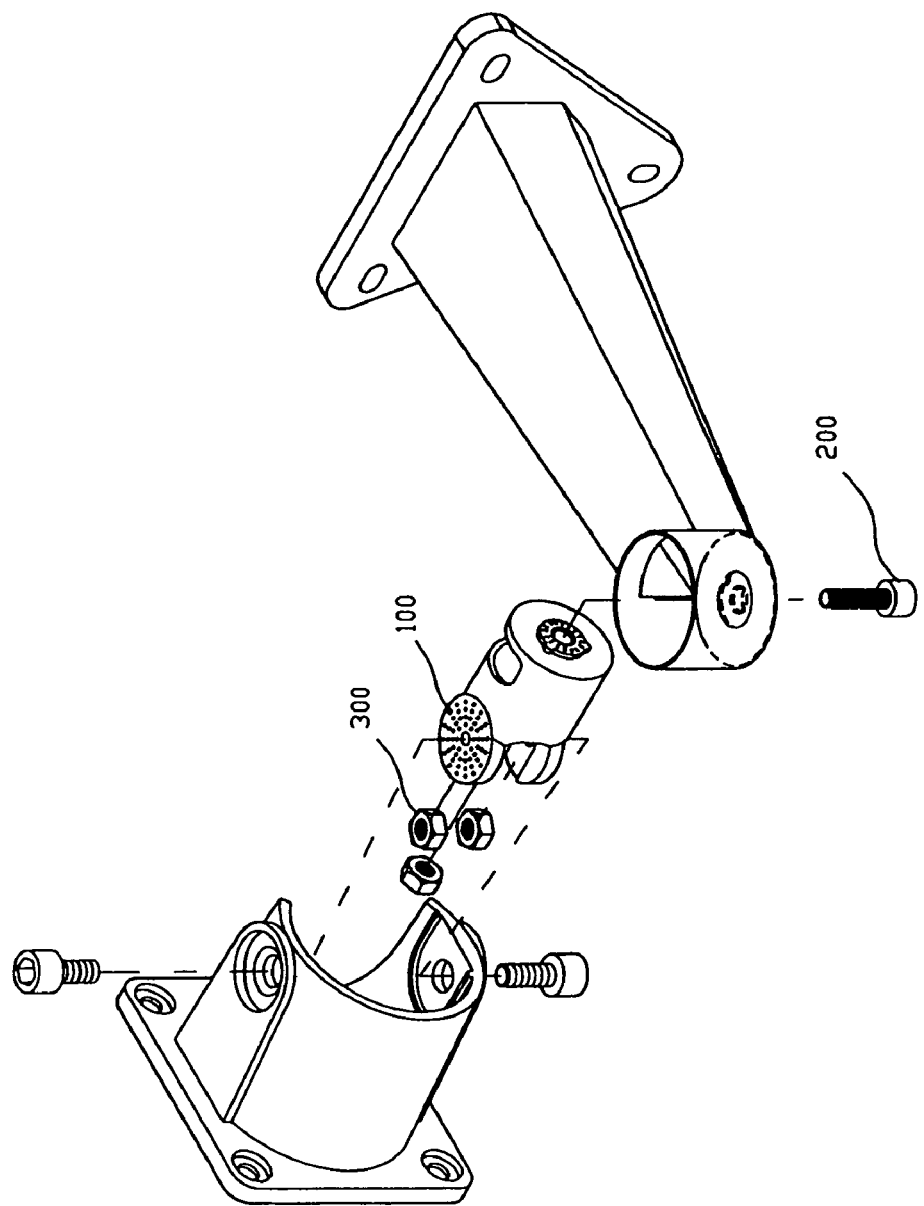
FIG. 1 is a perspective exploded view of a conventional support frame for CCTV camera.
Figure 2:
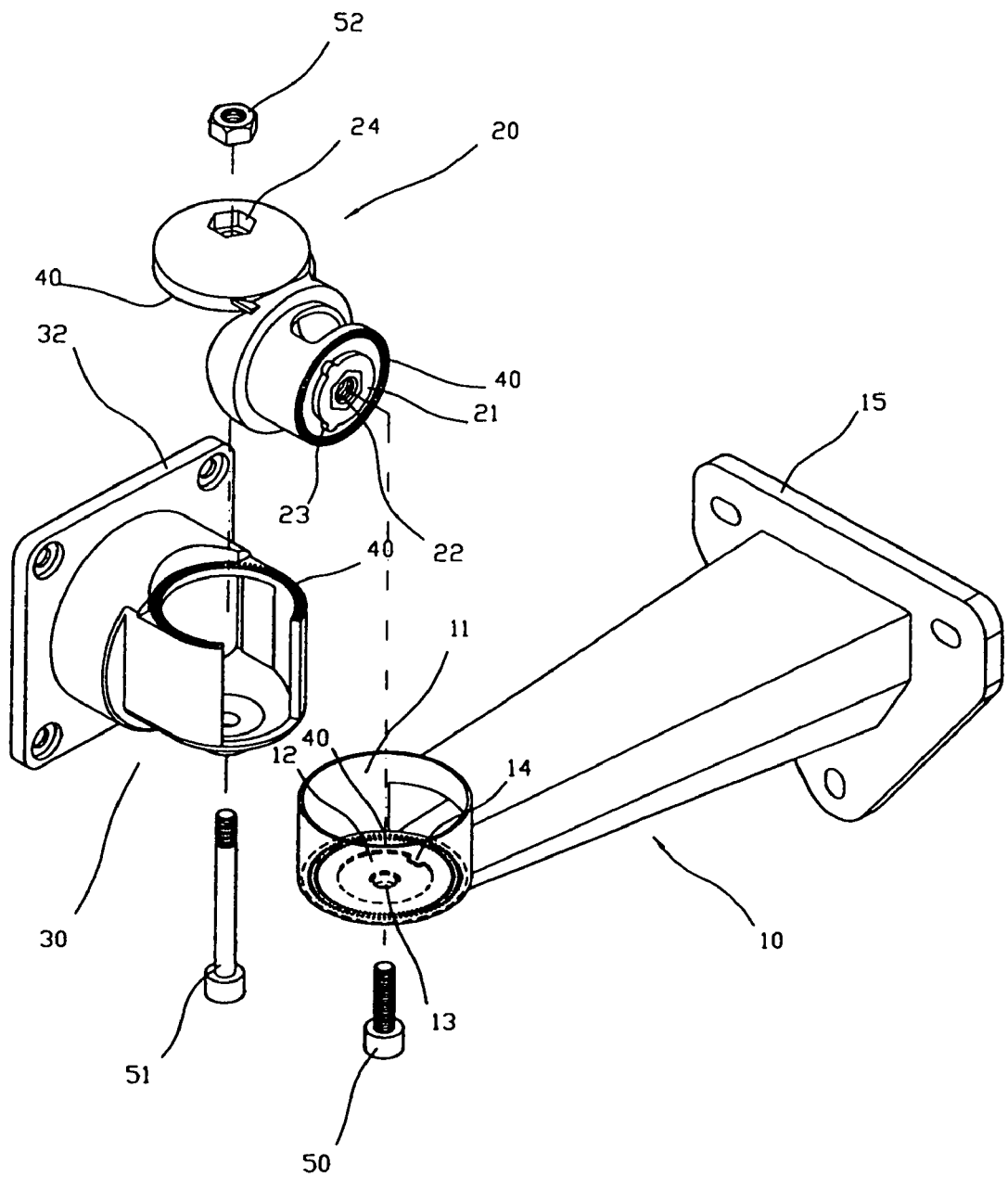
FIG. 2 is a perspective exploded view of the support frame for CCTV camera in accordance with the present invention.
Figure 3:
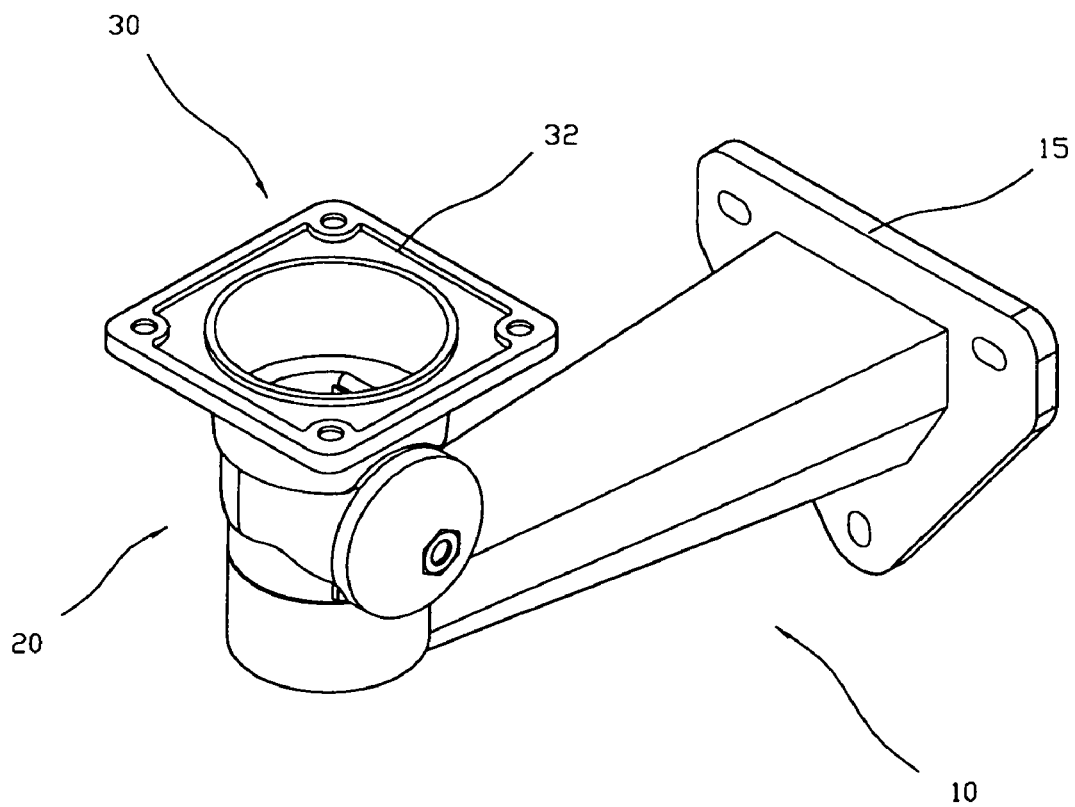
FIG. 3 is a perspective view of the support frame for CCTV camera of the present invention.

Referring to FIGS. 2 and 3, there is shown a support frame for a CCTV camera enclosure comprising a support body 10, a rotating section 20 and a securing section 30. In accordance with the present invention, the interior of the support body 10, the rotating section 20 and the securing section 30 is hollow, and their respective corresponding faces are contact faces 40 with protruded teeth facilitating locking by bolt and nut.

Figure 4:
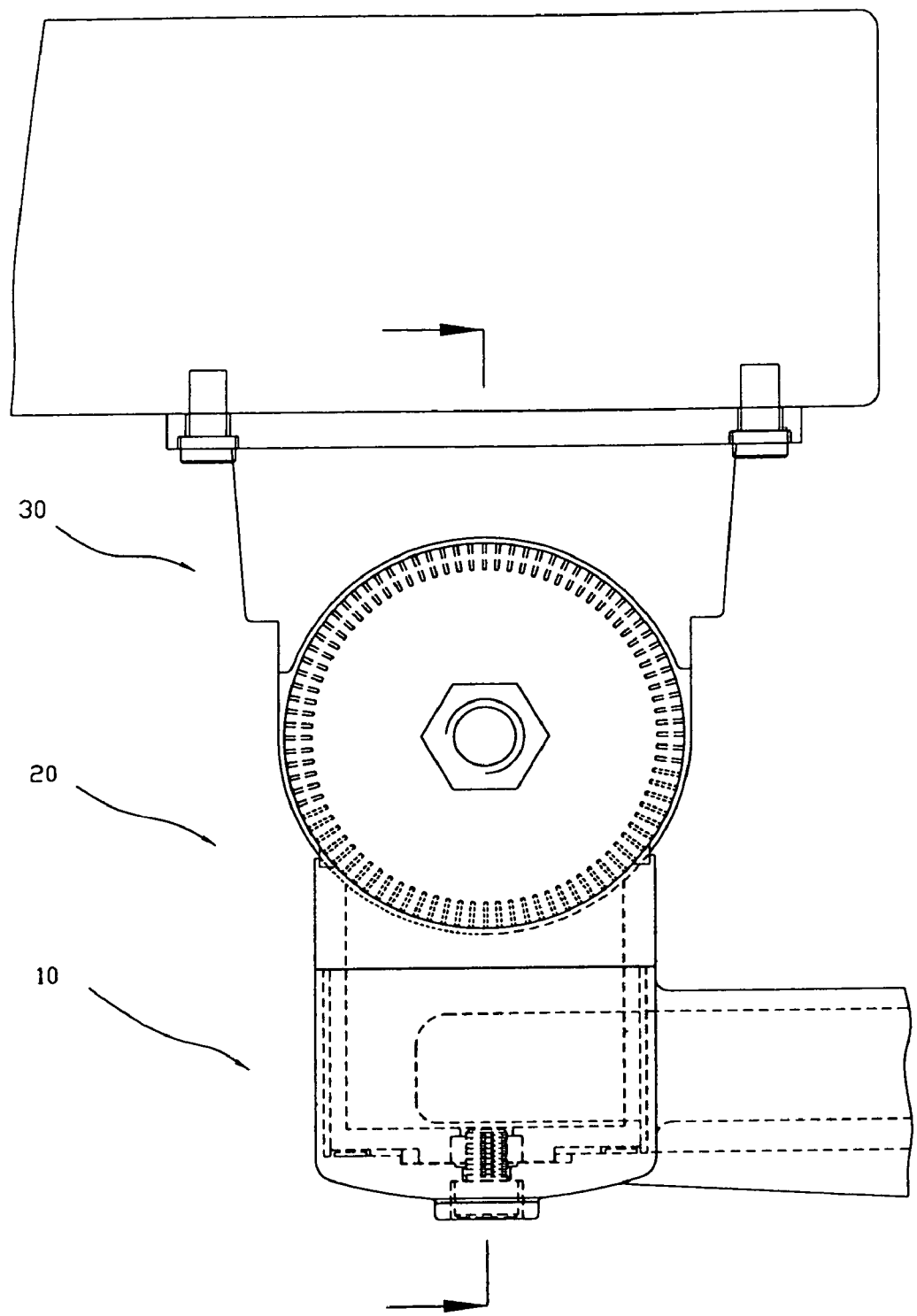
FIG. 4 is a schematic view of the support frame for CCTV camera of the present invention.
Figure 5:
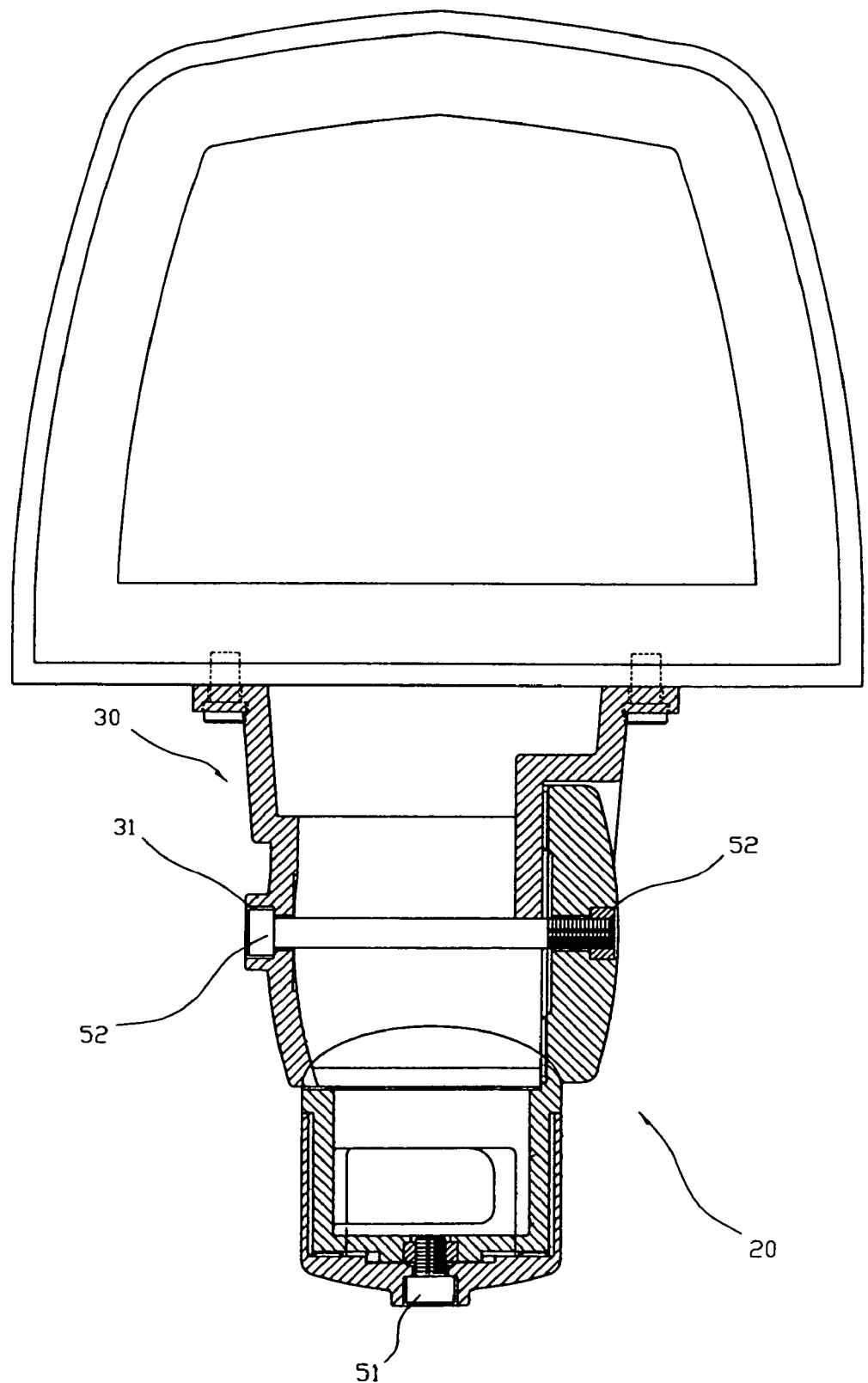
FIG. 5 is a sectional view of the support frame for CCTV camera of the present invention.

As shown in FIGS. 4 and 5, the contact face 40 at the lower section of the rotating section 20 is mounted within a cylindrical cavity 11 at the front end of the support body 10, and the contact face 40 of the rotating section 20 is provided with a circular protrusion 21 which is mountable with a circular recess 12 of the cylindrical cavity 11. There is a threaded hole 22 at the center of the circular protrusion 21 which is provided at the circumference with two protruded lugs 23. The cylindrical cavity 11 has an inner bottom which has a contact face provided with a plurality of protruded teeth. Further, the inner bottom has a circular recess 12 provided with a limiting block and surrounded by the protruded teeth. The circular recess 12 has a center through hole 13. A bolt 50 extends through the center through hole 13 of the support body 10 to engage with the threaded hole 22 of the rotating section 20.

The top of the rotating section 20 is connected to a circular disc which has a contact face 40 provided with a plurality of protruded teeth. The circular disc is provided with a hexagonal recess 24 and a through hole, and at a position corresponding to the securing section 32, a holding hole 31 is provided. The rotating section 20 and the securing section 30 are linked to each other by the nut 52 within a hexagonal slot and a bolt 51. The top end of the securing section 30 is provided with a securing plate 32 for securing a camera enclosure.

When the CCTV camera enclosure is to be mounted on a wall, the bolt first secures the securing seat 15 of the support body 10, and the enclosure is positioned at the securing plate 32 of the securing section 30, and the connection wiring of the enclosure passes through the interior of the support body, the rotating section and the securing section 30 to the enclosure.

Figure 6:
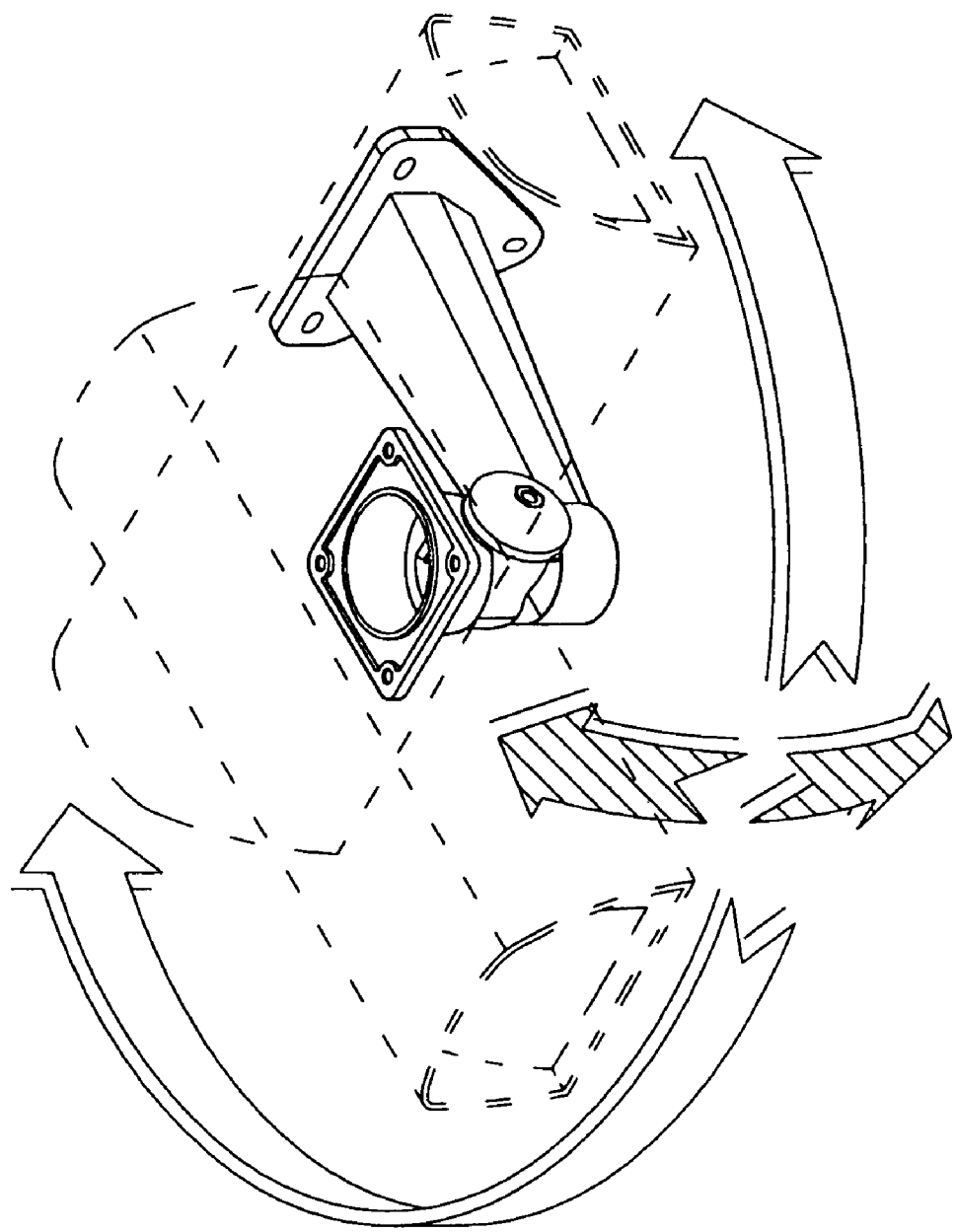
FIG. 6 is a schematic view showing the implementation of the support frame for CCTV camera of the present invention.

By releasing the bolt on the support body 10, the rotating section 20 causes a horizontal rotation of the transverse shaft of the support body 10 and the securing section 10 causes the rotating section 20 to rotate vertically. The range of rotating section 20 is restricted by the limiting block 14 and the protruded block 23. By means of the two types of axial rotation (as shown in FIG. 6), the CCTV camera on the support frame can be adjusted in all angles.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A support frame for CCTV enclosure comprising:

a hollow support body having a first end provided with a securing plate and a second end provided with a cylindrical cavity, said cavity having an inner bottom which has a first contact surface, said first contact surface having a circumference provided with a plurality of protruded teeth, said bottom further having a circular recess provided with a limiting block and surrounded by said teeth, said circular recess having a center through hole;

a hollow rotating section having a bottom which has a second contact surface having a circumference provided with a plurality of protruded teeth engageable with said protruded teeth of said first contact face, said bottom of said hollow rotating section further having a circular protrusion which is provided with a center threaded hole, said circular protrusion having a circumference provided two protruded lugs, said circular protrusion being rotatably engaged with said circular recess of said hollow support body and range of said hollow rotating section being restricted when a respective one of said outwardly protruded blocks is in contact with said limiting block of said hollow support body, said hollow rotating section being connected with a circular disc provided with a hexagonal recess, said circular disc having a third contact face provided with a plurality of teeth;

a first bolt extending through said center hole of said hollow support body to engage with said threaded hole of said rotating section;

a hollow securing section having a top provided with a securing plate, said securing section having a lateral side provided with a fourth contact face which has a plurality of protruded teeth rotatably engageable with said teeth of said third contact face of said hollow rotating section; and a second bolt extending through said hollow securing section to engage with a nut.

* * * * *